United States Patent [19]

Kanayama

[11] Patent Number: 4,477,751
[45] Date of Patent: Oct. 16, 1984

[54] MOTOR BRAKE DEVICE

[75] Inventor: Katsumi Kanayama, Tokyo, Japan

[73] Assignee: Olympus Optical Co., Ltd., Tokyo, Japan

[21] Appl. No.: 257,863

[22] Filed: Apr. 27, 1981

[30] Foreign Application Priority Data

May 1, 1980 [JP] Japan .................. 55-58401

[51] Int. Cl.³ ............................. H02P 1/22
[52] U.S. Cl. ................... 318/280; 318/293; 318/345 B; 318/345 F
[58] Field of Search .............. 318/362, 364, 365, 373, 318/463, 375, 376, 261, 273, 258, 345 B, 345 F, 379, 280, 293, 380, 294, 480, 445, 452, 284; 307/117, 249, 250; 357/92

[56] References Cited

U.S. PATENT DOCUMENTS

| | | | |
|---|---|---|---|
| 2,763,832 | 9/1956 | Shockley | 307/250 X |
| 2,816,238 | 12/1957 | Elliott | 307/250 X |
| 2,885,570 | 5/1959 | Bright et al. | 307/249 |
| 3,229,181 | 1/1966 | Evans | 318/293 |
| 3,297,928 | 1/1967 | Delden | 318/345 F X |
| 3,371,259 | 2/1968 | James et al. | 318/380 |
| 3,378,699 | 4/1968 | Bruinsma et al. | 318/293 |
| 3,427,520 | 2/1969 | Oppedahl | 318/294 X |
| 3,496,441 | 2/1970 | Heider et al. | 318/294 X |
| 3,525,883 | 8/1970 | Iordanidis | 318/293 X |
| 3,737,751 | 6/1973 | Lima | 318/463 |
| 3,776,111 | 12/1973 | Maida | 307/117 X |
| 3,809,981 | 5/1974 | Maida | 318/480 |
| 3,865,648 | 2/1975 | Castrucci et al. | 357/92 X |
| 4,079,298 | 3/1978 | Prayer | 318/280 X |
| 4,096,399 | 6/1978 | Davis et al. | 307/249 |
| 4,319,171 | 3/1982 | Motoori | 318/379 |

FOREIGN PATENT DOCUMENTS 2228735 6/1972 Fed. Rep. of Germany .
2726810 6/1977 Fed. Rep. of Germany .

Primary Examiner—Ulysses Weldon
Attorney, Agent, or Firm—Frishauf, Holtz, Goodman and Woodward

[57] ABSTRACT

A motor brake device comprises a plurality of transistors for shunting a circuit loop through which a back electromotive force current caused by an inertia rotation of the motor flows, in which some of these transistors are operated as an inversed transistor (a transistor operated in a state where the collector and the emitter are interchanged with each other). The brake current for the motor flows through the collector-emitter paths of the transistor and the reversed transistor, each of which exhibits a small voltage drop. Therefore, the electromagnetic brake may effectively be applied to the motor even at a considerably low back electromotive force of the motor.

6 Claims, 10 Drawing Figures

MOTOR BRAKE DEVICE

BACKGROUND OF THE INVENTION

The present invention relates to a motor brake device for stopping an inertia-rotating rotor of a motor under an electromagnetic brake.

In a small sized tape recorder, particularly a microcassette tape recorder of which the mechanism is under a logic control, it is difficult to assemble a mechanical motor brake device into the tape recorder. In the case of a tape recorder requiring a size reduction in order to be as small as possible, such as a microcassette, the assemblage of a mechanical brake device, e.g. a motor brake mechanism, into the tape transport mechanism is accompanied by not only impeding the size-reduction of the mechanism but also increase of the production cost. A prior art device developed in light of the above problems is, for example, a brake device disclosed in Japanese Utility Model Application No. 77910/79. FIG. 1 of the present application shows a rewritten circuit diagram of FIG. 1 thereof. When the motor is forwardly rotated, transistors T1 and T2 are turned on and a drive current ID flows from one end 1 to the other end 2 of the motor M. For stopping the motor M, the transistors T1 and T2 are turned off and a transistor T3 is turned on. Upon the turning on of the transistor T3, both ends (1, 2) of the motor M are shunted via the transistor T3 and a diode D2 through which a brake current IB flows. The current IB produces and applies a magnetic field for preventing the inertia rotation of the rotor of the motor M to the inside of the motor M. Accordingly, the current IB continues its flow so long as a back electromotive force Vemf of the motor M has a voltage sufficient to flow the current IB. In accordance with the magnitude of the current IB, an electromagnetic brake is applied to the rotation of the rotor of the motor M.

FIG. 2A shows a circuit portion through which the brake current IB flows and FIG. 2B shows its equivalent circuit. For obtaining the brake current IB with a magnitude sufficient to brake the rotation of the rotor, the back electromotive force Vemf should have a magnitude larger than a given value. This will be discussed referring to FIG. 3. In FIG. 3, a curve A designates a forward voltage drop vs. forward current characteristic of the diode D2, a curve B a collector-emitter voltage vs. collector current across the collector-emitter path of the transistor T3, and a straight line C represents a resistance of an internal resistor Rm of the motor M. A voltage vs. current characteristic of the current IB loop in FIG. 2B is represented by a composite curve D of the curves A, B and C.

Assume now that the lower limit of the current IB for providing an effective brake against the rotor rotation of the motor M is IBo shown in FIG. 3. Further assume that the current lower limit IBo is 10 mA, the transistor T3 and the diode D2 are of the silicon type, and Rm=1 ohm, and that a forward voltage drop across the diode D2 is approximately 700 mV, a collector-emitter voltage drop of the transistor T3 is approximately 90 mV, and a voltage drop by the resistor Rm is 10 mV. The voltage drop caused by the diode D2, the transistor T3 and the internal resistor Rm is represented by a voltage Vemf1 at the cross point of the current lower limit IBo and the curve D. The validity of a relation $IB \geq IBo$ requires the following relation:

$$Vemf \geq Vemf1 \simeq 700 + 90 + 10 = 800 \text{ (mV)}$$

When $Vemf < Vemf1$, $IB < IBo$ and the braking is ineffectively applied to the inertia rotation of the rotor.

Let us consider a case where a power supply voltage for the motor M is 1.5 V of a single manganese battery. So long as the motor M is in a forward rotation mode (or a reverse rotation mode), a current of the order of 100 mA generally flows into the motor M through the transistors T1 and T2. In this case, if the sum of the collector-emitter saturation voltages of the transistors T1 and T2 is 0.5 V, the effective supply voltage for the motor rotating in the forward mode is 1.0 V. In such a device, when the transistors T1 and T2 are turned off and the transistor T3 is turned on, the back electromotive force Vemf of the motor M is rapidly decreased from a value slightly less than 1,000 mV. As described above, if $Vemf1 \simeq 800$ mV, $IB > IBo$ is held during a period that the Vemf decreases from about 1,000 mV to about 800 mV, so that the electromagnetic damping is effectively applied to the motor M. Accordingly, until Vemf decreases down to Vemf1, the rotating speed of the motor M rapidly decreases. However, when $Vemf < Vemf1$, the damping current IB falls below the current lower limit IBo and little braking is applied to the motor M. Therefore, in the conventional device shown in FIG. 1, when the power supply voltage for the motor M is relatively low (of the order of a few volts), the magnetic brake is ineffectively applied to the motor and a period from the interruption of the power supply to the motor M to the stop of the rotor tends to be elongated.

SUMMARY OF THE INVENTION

Accordingly, an object of the present invention is to provide a motor brake device which can apply an effective brake to a motor with a relatively low power supply voltage.

To achieve the above object, a motor brake device according to the present invention has a plurality of transistors for shunting a circuit loop through which a back electromotive force current caused by an inertia rotation of the motor flows, in which some of these transistors are operated as an inversed transistor, i.e. a transistor operated in a state where the collector and the emitter are interchanged with each other. In other words, the brake current for the motor flows through the collector-emitter paths of the transistor and the reversed transistor, each of which exhibits a small voltage drop. Therefore, the electromagnetic brake may effectively be applied to the motor until the back electromotive force of the motor falls to a considerably low level.

The present invention will better be understood when carefully reading the following description taken in connection with the accompanying drawings:

DETAILED DESCRIPTION OF THE PREFERRED EMBODIMENTS

Before proceeding with the description of the embodiments of the invention, it will expressly be understood that like reference symbols are used to designate like portions throughout the drawings for simplicity of illustration and that the components designated by like reference symbols may easily be replaced with each other or one another with minor change thereof by a skilled person in the art. An embodiment of a motor brake apparatus according to the invention will be described.

Figure 4:
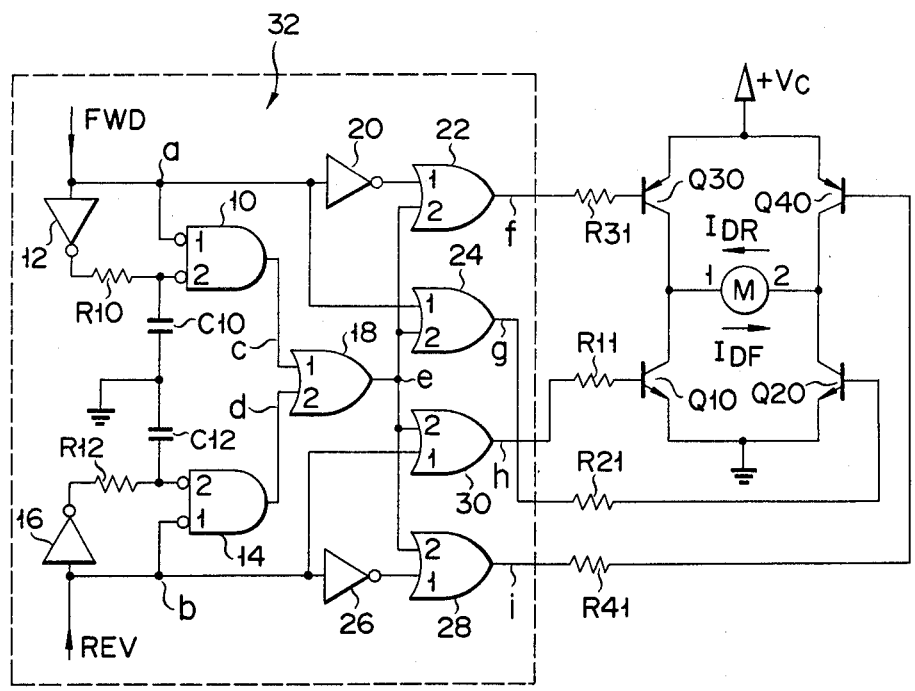
FIG. 4 is a circuit diagram of a major part of a motor brake device which is an embodiment of the present invention.

FIG. 4 shows a major part of the motor brake device according to the present invention. A forward instruction signal FWD which directs a motor M to make a forward rotation (e.g. a clockwise rotation) when it is logical "1" is inputted into a first inverted input of an AND gate 10. The signal FWD is also applied to a second inverted input of the gate 10, through an inverter 12 and a resistor R10. The second inverted input is grounded through a capacitor C10. The pulses of the signal FWD each have a leading edge (Fl) and a trailing edge (Ft), as seen from waveform (a) in FIG. 5. A reverse instruction signal REV for directing the motor M to make a reverse rotation (e.g. a counterclockwise rotation), is applied to a first inverted input of an AND gate 14. The signal REV is applied to a second inverted input of the gate 14, through an inverter 16 and a resistor R12. The second inverted input is grounded through a capacitor C12. The pulses of the signal REV each have a leading edge (Rl) and a trailing edge (Rt), as seen from waveform (b) in FIG. 5. The outputs from the gates 10 and 14 are respectively applied to first and second inputs of an OR gate 18.

The signal FWD is applied to the first input of an OR gate 22, through an inverter 20 and is also applied to the first input of an OR gate 24. The signal REV is applied to the first input of an OR gate 28 through an inverter 26 and is also applied to the first input of an OR gate 30. The output signal from the OR gate 18 is applied to the respective second inputs of the OR gates 22, 24, 28 and 30. The components 10 to 30, R10, R12, C10 and C12 constitute a control means 32 for making and ON/OFF control of first to fourth transistors to be described later. A control apparatus disclosed in Japanese patent application No. 41601/79 filed by the same assignee as the one of the present patent application may be used for the control means 32. A commercially available IC such as Model M54410P: Key Controller for Tape Deck, manufactured by Mitsubishi Electric Corp., Japan may also be used for the means 32.

The output from the OR gate 30 is connected through a resistor R11 to the base of a first transistor Q10 of NPN type. The output of the OR gate 24 is connected to the base of a second transistor Q20 of NPN type, through a resistor R21. The output of the OR gate 22 is connected to the base of a PNP third transistor Q30, through a resistor R31. The output of the OR gate 28 is connected to the base of a fourth transistor Q40 of PNP type, through a resistor R41. The emitters of the transistors Q10 and Q20 are grounded and the emitters of the transistors Q30 and Q40 are connected to a power source +Vc. The collectors of the transistors Q10 and Q30 are connected to the first terminal of the motor M. Also the collectors of the transistors Q20 and Q40 are connected to the second terminal of the motor M.

Figure 5:
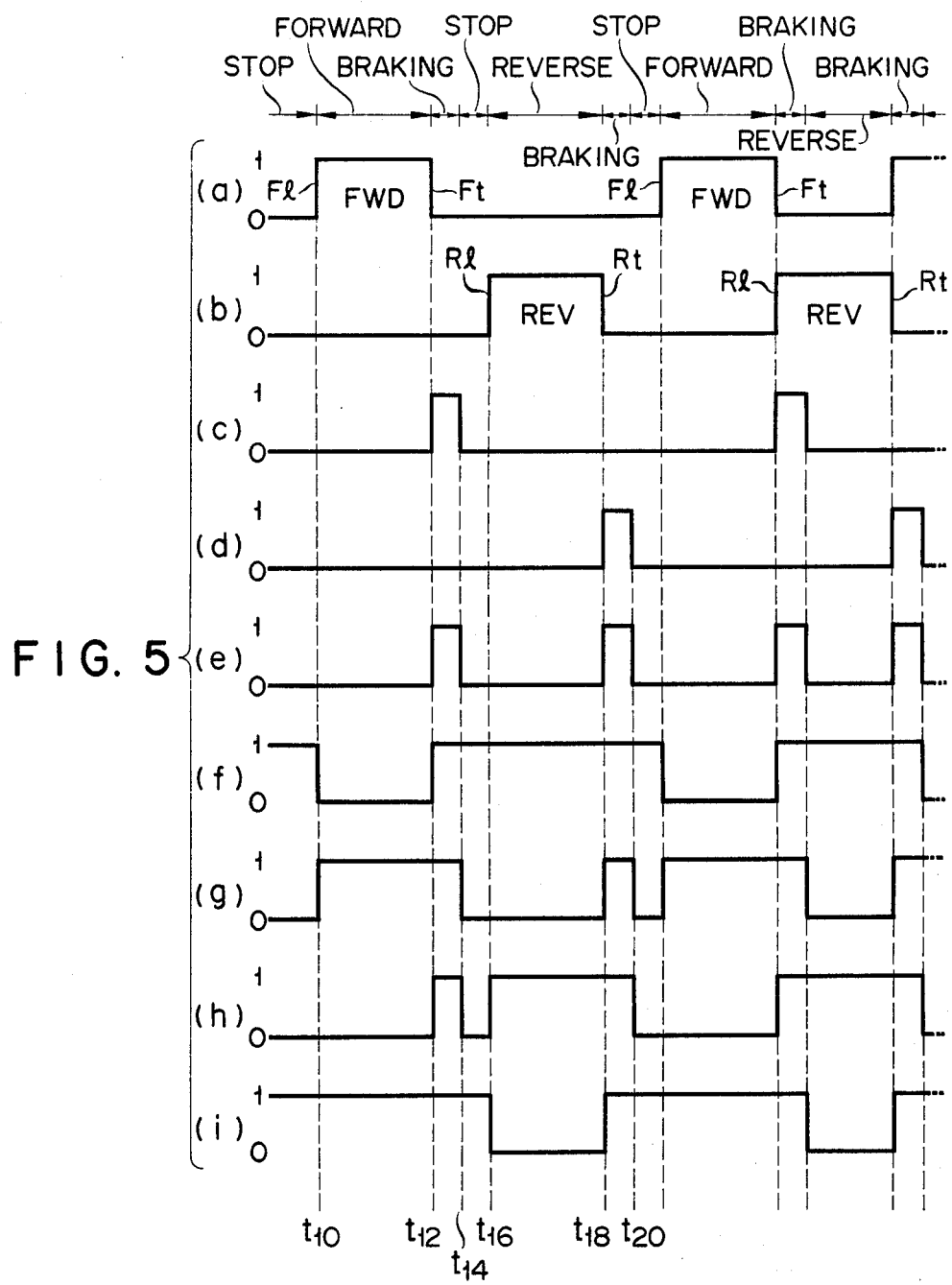
FIG. 5 is a timing chart useful in explaining the operation of the circuit shown in FIG. 4.

The operation of the circuit shown in FIG. 4 will be described referring to a timing chart shown in FIG. 5. Waveforms (a) to (i) in FIG. 5 are logic signals at respective points a to i shown in FIG. 4.

In a stop mode before time t10, the signal FWD, or a signal a and the signal REV, or a signal b, are logical "0". At this time, the output signals f and i of the OR gates 22 and 28 are logical "1" and the output signals g and h from the OR gates 24 and 30 are logical "0". Under this condition, the transistors Q10 to Q40 are all turned off and the motor M is at a standstill.

When the forward command is issued after time t10, that is to say, the signal a becomes logic "1", the signal f is logical "0" and the signal g is logical "1". At this time, an output signal e (a "trailing signal") from the OR gate 18 is left logical "0". A state that the signal f="0" and the signal g="1" turns on the transistors Q30 and Q20, so that a forward drive current IDF flows from one end 1 to the other end 2 of the motor M. Then, the motor rotates in the forward direction (e.g. clockwise).

Figure 6A:
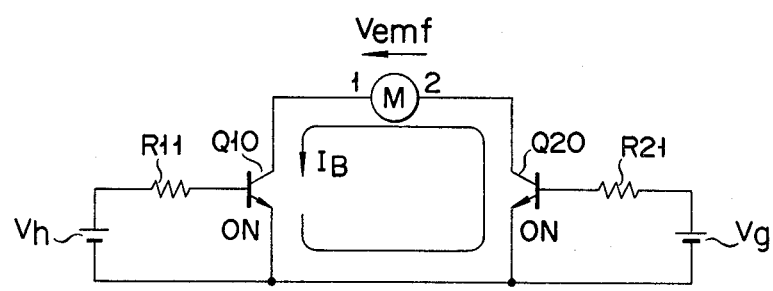
FIG. 6A shows a circuit loop for the brake current IB due to the back electromotive force Vemf of the motor M.

When a command to stop the motor M is issued at time t12, the signal a returns to logical "0". After time t12, the second inverted input of the gate 10 is kept at logical "0" till time t14 determined by the time constant R10 and C10, and an input threshold level of the gate 10. Therefore, during a period from t12 to t14, the output of the gate 10, or a signal c (a "forward trailing signal"), is logical "1". Then, the signal e is logical "1", so that the duration from time t12 to t14 has a logical state of "1" for all of the signals f, g, h and i. As a result, the transistors Q30 and Q40 are turned off and the transistors Q10 and Q20 are turned on. In this case, the drive current IDF is zero. At this time, however, there is present the back electromotive force Vemf due to the inertia rotation of the rotor of the motor M. Therefore, the control current IB as shown in FIG. 6A flows through the collector-emitter paths of the transistors Q10 and Q20. The explanation with relation to FIGS. 4 and 5 provisionally ceases here because the explanation for the flow of the brake current IB follows.

Figure 6B:
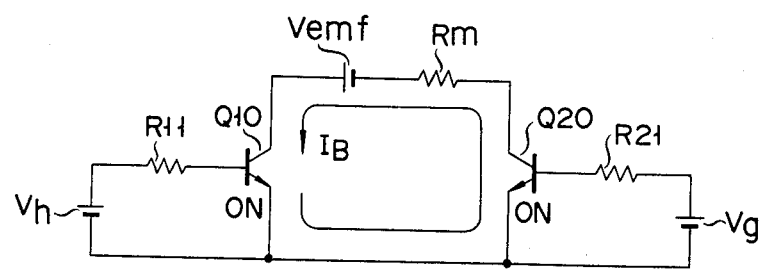
FIG. 6B shows an equivalent circuit of the circuit shown in FIG. 6A.

In FIG. 6A, the voltages Vh and Vg are voltages corresponding to the logical level "1" of the signals h and g, respectively. FIG. 6B shows an equivalent circuit of FIG. 6A and Rm designates a resistance of an internal resistor of the motor M. In FIG. 6B, the transistor Q10 performs an ordinary transistor operation, but the transistor Q20 performs the inversed transistor operation. This will be described referring to FIGS. 6C and 6D.

Figure 6C:
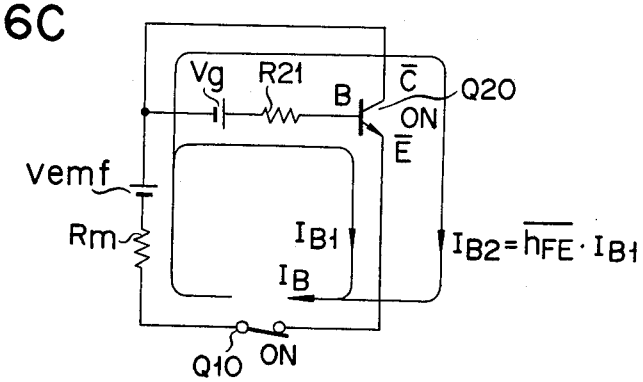
FIG. 6C shows a circuit diagram useful in explaining a flow of the brake current IB (=IB1+IB2) in the circuit shown in FIG. 6B.
Figure 6D:
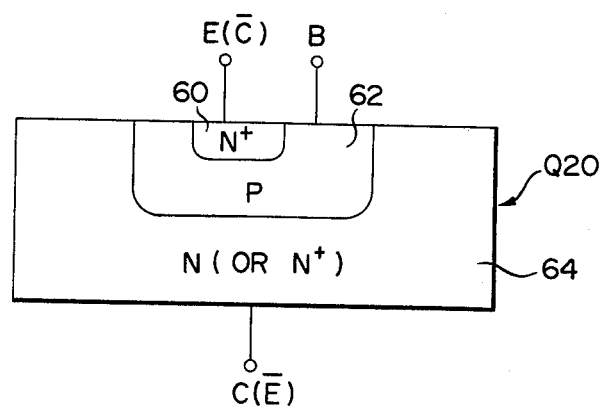
FIG. 6D shows a diagram for illustrating that an NPN transistor shown in FIG. 6C is operable as an inversed transistor with interchanged collector and emitter.

FIG. 6C is a rewritten circuit of FIG. 6B, and FIG. 6D is an example of a structure of the transistor Q20. FIG. 6D implies that even if the collector is interchanged with the emitter, the structure is still that of an NPN bipolar transistor, basically. Usually, in order to increase a DC current amplification factor $h_{FE}$ in an emitter common operation mode, an N carrier concentration in an N+ region 60 is selected to be high. Usually, in order to increase the breakdown voltage between the base (B) and the collector (C), the carrier concentration in an N region 64 is selected to be low. for this reason, when the region 64 is used for the emitter (E) and the region 60 for the collector (C), that is to say, the transistor is used as the inversed transistor, the current amplification factor $\overline{h_{FE}}$ is small and the breakdown voltage between the collector and the base (a breakdown voltage at the PN junction between the regions 60 and 62) is also low. When the voltage of the power source +Vc is of the order of several volts, however, such low breakdown voltage may be negligible. Further, if the circuitry shown in FIG. 4 is fabricated by IC technology and the carrier concentration in the emitter and collector regions of the transistors Q10 to Q40 is set to be high, the breakdown voltage between the collector (C) and the emitter (E) when the transistor operates in a normal mode possibly decreases to about 10 V, but the amplification factor $\overline{h_{FE}}$ may be increased. This is realized by increasing the carrier concentration in the region 64, that is, forming the N+ region 64.

From the foregoing description, it will be understood that the transistor Q20 well operates as an inversed transistor. Returning now to FIG. 6C, there is illustrated an important fact, in addition to the fact that the transistor Q20 may operate as the inversed transistor. The important fact is that the transistor Q20 is perfectly turned on irrespective of the back electromotive force Vemf and the transistor Q20 is biased by the voltage sum Vemf+Vg. This is one of the important features of the present invention. In other words, the brake current IB continues its flow until the inertia rotation of the motor M almost stops and the back electromotive force Vemf is almost zero. In FIG. 6C, this current IB is illustrated in the form of the base current IB1 and the collector current IB2 of the transistor Q20. Of course, IB=IB1+IB2.

Figure 3:
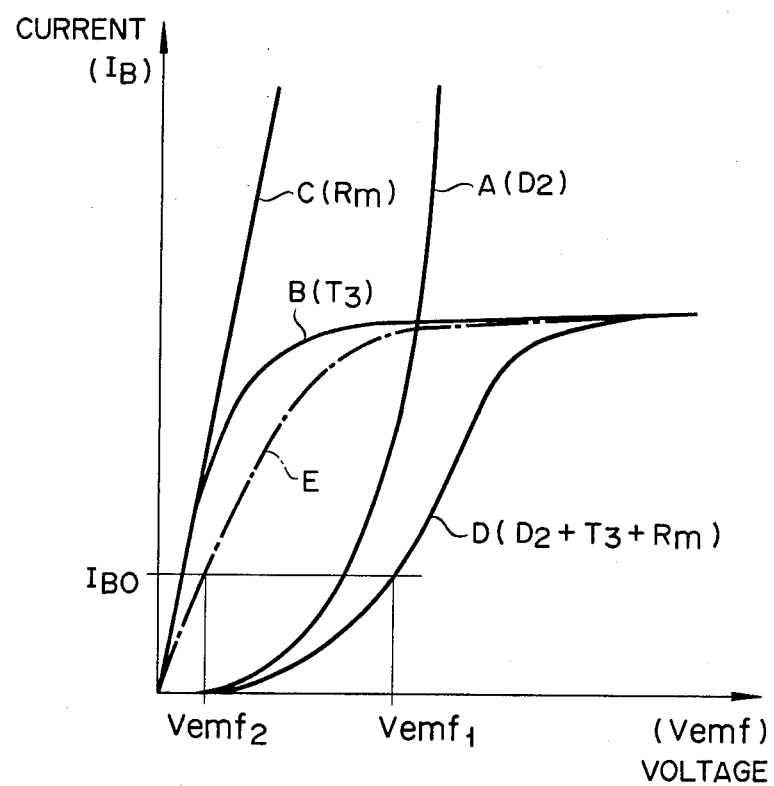
FIG. 3 graphically illustrates voltage-current characteristics between the anode and cathode of a PN junction diode and between the collector and emitter of a bipolar transistor turned on, and a composite characteristic of the above characteristics.

As described by using FIG. 3, suppose that the current lower limit to provide the effective brake is 10 mA and the sum of the voltage drops across the collector-emitter paths of the transistors Q10 and Q20 is relatively large, about 200 mV. Under this condition, a voltage vs. current characteristic of the current IB loop shown in FIG. 6C may be indicated by a curve E and the voltage Vemf2 corresponding to the IBo=10 mA is approximately 200 mV, as shown in FIG. 3. For comparing the conventional circuit shown in FIG. 1, the effective power supply voltage to the motor M is assumed to be 1.0 V when the motor M is in the forward rotation mode. In the circuit shown in FIG. 1, when the Vemf drops from 1 V to about 800 mV or less, the brake current IB flowing therethrough has an insufficient amplitude. Therefore, it insufficiently brakes the inertia rotation of the rotor, as previously described. On the other hand, the circuit shown in FIG. 4 effectively electromagnetic brakes the rotor over a range that the Vemf drops from 1 V to approximately 200 mV.

As described above, it will be seen that the action of the transistors Q10 and Q20 applies an effective electromagnetic brake to the motor M to almost stop the inertia rotation of the rotor of the motor M for a short period of time.

Returning to FIG. 5, during a period from time t12 to t14, the current IB puts on brake to almost stop the rotor of the motor M. After time t14, the rotor of the motor M continues the inertia rotation for a very short time. At this time point, however, the rotating kinetic energy is very slight in amount. Therefore, mechanical energy loss such as friction perfectly stops the rotation of the motor M immediately after time t14. When the signal a is logical "0" after time t14, the signals f and i keep their logical state "1", while the signals g and h return to the logic "0" state. The time interval from time t12 to time t14 is properly selected in accordance with kinetic energy of the rotor of the motor M and a mechanism coupled with the rotor. The selection of the time interval may properly be selected by changing the time constant by R10 and C10.

A case where a reverse command is issued will be described. When the signal b is logical "1" after time t16, the signal h is logical "1" and the signal i is logical "0" since the signal e has been logical "0" after time t14. At this time, the signal f remains logical "1" and the signal g remains logical "0". Logical states that the signal h="1" and the signal i="0" turn on the transistors Q10 and Q40, while logical states that the signal f="1" and the signal g="0" cause the transistors Q30 and Q20 to be left OFF. In this case, a reverse drive current IDR flows from the other end 2 to one end 1 of the motor M, to reverse the rotation of the rotor (e.g. counterclockwise).

When a command to stop the motor M is issued at time t18, the signal b returns to logic "0". After time t18, the second inverted input of the gate 14 is kept logical "0" during a period from time t18 to time t20 determined by the time constant by R12 and C12 and the input threshold level of the gate 14. For this reason, during a period from time t18 to t20, the output from the gate 14, i.e. a signal d (a "reverse trailing signal"), is logical "1". Upon this, the signal e is also logical "1", so that the signals f, g, h and i are all logical "1". Accordingly, the transistors Q30 and Q40 are turned off and the transistors Q10 and Q20 are turned on. In this case, the brake current IB flows in an opposite direction to that of the current shown in FIG. 6A to make the electromagnetic brake against the motor M. At this time, the transistor Q10 operates as an inversed transistor. The operation after time t20 is similar to that from time t10 to t20 as already described. No further description of it will therefore be given.

Figure 1:
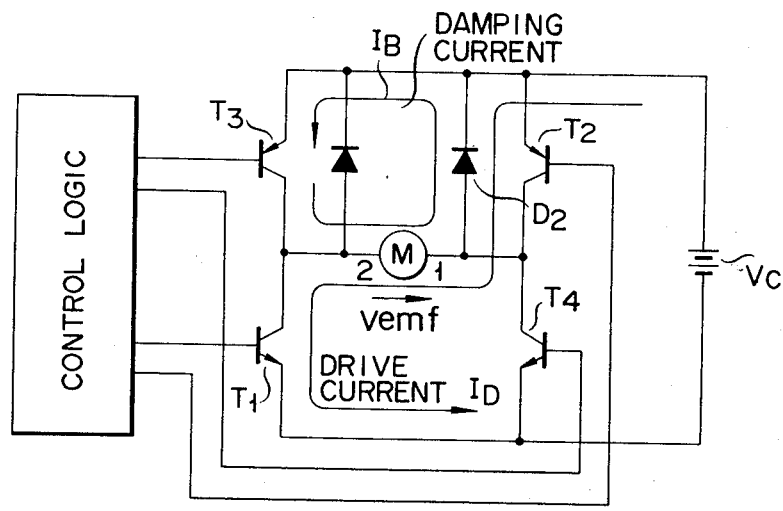
FIG. 1 is a circuit diagram of a conventional motor brake device taking advantage of an electromotive force of a motor.
Figure 2A:
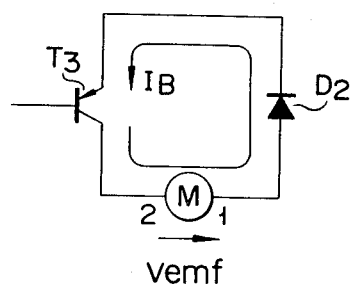
FIG. 2A shows a circuit loop for a brake current IB caused by the electromotive force Vemf shown in FIG. 1.
Figure 2B:
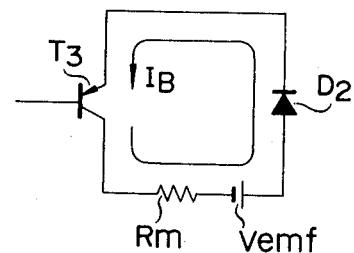
FIG. 2B is an equivalent circuit of the circuit shown in FIG. 2A.

As described above, the motor control device according to the present invention can apply an intensive brake to the motor even in a low voltage operation mode. In comparison with the conventional circuit as shown in FIG. 1, the present invention does not need current conduction devices to feed the brake current IB, such as diodes, thus leading to cost reduction to manufacture.

The embodiment of the present invention described in detail in the specification and its accompanying drawings is not limited to the present invention in any way. The present invention may be variously changed and modified within the scope and spirit of the present invention. For example, the OR gates 22, 24, 28 and 30 are replaced by a NOR gate, the transistors Q30 and Q40 form a circuit including an inversed transistor for making the brake current to flow. If the OR gates 22 and 28 are replaced by a NOR gate and the transistors Q30 and Q40 by an NPN transistor, the circuit function of FIG. 4 is substantially unchanged. The transistors Q10 to Q40 may be formed by not only the hybrid circuit of PNP/NPN but also the PNP or NPN type transistors, as disclosed in Japanese patent application No. 41601/79 (corresponding to U.S. Ser. No. 134,064). The control means 32 may be constructed by a mechanical switch which is turned on or off in accordance with the operation mode of a tape recorder mechanism (not shown). The essential thing is some of the plurality of transistors in the loop through which the control current IB flows is operated as the inversed transistors.

What is claimed is:

1. A motor device for controlling a motor having two terminals, the motor device comprising:
   a source of forward and reverse instruction signals, said forward and reverse instruction signals each having leading and trailing edges; said forward instruction signal designating a forward rotation of a motor and said reverse instruction signal designating a reverse rotation of said motor;
   signal means responsive to a forward instruction signal and to a reverse instruction signal, for providing a trailing signal which is generated for a given period of time following the trailing edge of said forward instruction signal and the trailing edge of said reverse instruction signal;
   first gate means coupled to said signal means and being responsive to said forward instruction signal and to said trailing signal, for providing a first signal which corresponds to the logical OR of said trailing signal and a signal having an inverted level of said forward instruction signal;
   second gate means coupled to said signal means and being responsive to said forward instruction signal and to said trailing signal, for providing a second signal which corresponds to the logical OR of said trailing signal and said forward instruction signal;
   third gate means coupled to said signal means and being responsive to said reverse instruction signal and to said trailing signal, for providing a third signal which corresponds to the logical OR of said trailing signal and a signal having an inverted level of said reverse instruction signal;
   fourth gate means coupled to said signal means and being responsive to said reverse instruction signal and to said trailing signal, for providing a fourth signal which corresponds to the logical OR of said trailing signal and said reverse instruction signal;
   a first transistor having an emitter-collector path which is coupled between a first power supply potential and a first terminal of said motor, and a base which receives said first signal;
   a second transistor having an emitter-collector path which is coupled between a second power supply potential and a second terminal of said motor, and a base which receives said second signal;
   a third transistor having an emitter-collector path which is coupled between said first power supply potential and the second terminal of said motor, and a base which receives said third signal; and
   a fourth transistor having an emitter-collector path which is coupled between said second power supply potential and the first terminal of said motor, and a base which receives said fourth signal;
   said second signal having the same logic level as said fourth signal during said given period of time, so that said second and fourth transistors are simultaneously turned on, the first and second terminals of said motor thereby being short-circuited through the emitter-collector path of said second and fourth transistors.

2. The motor device of claim 1 wherein said signal means includes:
   first delay means for delaying said forward instruction signal by a fixed amount to provide a first delayed signal;
   fifth gate means coupled to said first delay means and being responsive to said forward instruction signal and to said first delayed signal, for providing a forward trailing signal which is generated for said given period of time, just after the trailing edge of said forward instruction signal;
   second delay means for delaying said reverse instruction signal by a fixed amount to provide a second delayed signal;
   sixth gate means coupled to said second delay means and being responsive to said reverse instruction signal and to said second delayed signal, for providing a reverse trailing signal which is generated for said given period of time, just after the trailing edge of said reverse instruction signal; and
   means coupled to said fifth and sixth gate means, for generating said trailing signal corresponding to the logical OR of said forward and reverse trailing signals.

3. The motor device of claim 1 wherein, during said given period of time, one of said second and fourth transistors operates in a normal mode in which a current caused by the counterelectromotive force of said motor flows into the collector-emitter path of one of said second and fourth transistors, and the other of said second and fourth transistors operates in an inverse mode in which a current caused by the counterelectromotive force of said motor flows into the collector-emitter path of the other of said second and fourth transistors; said inverse mode being equivalent to an operational mode in which the collector of normal mode is used as an emitter and the emitter of normal mode is used as a collector.

4. The motor device of claim 2 wherein, during said given period of time, one of said second and fourth transistors operates in a normal mode in which a current caused by the counterelectromotive force of said motor flows into the collector-emitter path of one of said second and fourth transistors, and the other of said second and fourth transistors operates in an inverse mode in which a current caused by the counterelectromotive force of said motor flows into the collector-emitter path of the other of said second and fourth transistors; said inverse mode being equivalent to an operational mode in which the collector of normal mode is used as an emitter and the emitter of normal mode is used as a collector.

5. The motor device of claim 3 wherein respective collector regions and emitter regions of the second and fourth transistors have high carrier concentrations, so that a current amplification factor of one of said second and fourth transistors, which operates in said inverse mode, becomes close to a current amplification factor of the other of said second and fourth transistors, which operates in said normal mode.

6. The motor device of claim 4 wherein respective collector regions and emitter regions of the second and fourth transistors have high carrier concentrations, so that a current amplification factor of one of said second and fourth transistors, which operates in said inverse mode, becomes close to a current amplification factor of the other of said second and fourth transistors, which operates in said normal mode.

* * * * *